(12) United States Patent
Anandaraj (10) Patent No.: US 8,930,294 B2
(45) Date of Patent: Jan. 6, 2015

(54) PREDICTING USER ACTIVITY BASED ON USAGE DATA RECEIVED FROM CLIENT DEVICES

(75) Inventor: Krishna Kumar Anandaraj, Coppell, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 13/562,256

(22) Filed: Jul. 30, 2012

(65) Prior Publication Data

US 2014/0032468 A1      Jan. 30, 2014

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| 8,195,638 | B1 | 6/2012 | Barnes et al. |
| 2009/0265220 | A1 | 10/2009 | Bayraktar et al. |
| 2011/0087769 | A1 | 4/2011 | Holmes et al. |
| 2011/0087966 | A1* | 4/2011 | Leviathan ............... 715/745 |
| 2011/0208862 | A1 | 8/2011 | Maffione et al. |
| 2014/0032468 | A1* | 1/2014 | Anandaraj ................ 706/46 |

OTHER PUBLICATIONS

Martinez, J., "Verizon Changes Privacy Policy to Build Target Ad Program," available at URL < http://www.dmnews.com/verizon-changes-privacy-policy-to-build-targeted-ad-program/article/214297/ > website, published Oct. 13, 2011.
Unknown, "Targeted Advertising for IPTV," available at URL< http://sureshvee.wordpress.com/2008/06/07/targeted-advertising-for-iptv/ > website, published Jun. 7, 2008.
Unknown, "Like Button," available at URL < https://developers.facebook.com/docs/reference/plugins/like/ > website, accessed Jul. 26, 2012.

* cited by examiner

*Primary Examiner* — Michael B Holmes (57) ABSTRACT

A system for determining an interest of a user based on usage data is provided. Usage data corresponding to a plurality of websites accessed by a user is received from one or more computing devices of the user. The received usage data is categorized into a plurality of categories based on character strings that reference the individual websites. What content items from individual websites the user has selected to view is recorded in order to identify one or more items of interest. An activity of the user at a given time period is predicted based on the categorizations, the identified one or more items of interest, and times and duration of times the user viewed the individual websites. The system performs an action at the given time period based on the predicted activity.

12 Claims, 5 Drawing Sheets

PREDICTING USER ACTIVITY BASED ON USAGE DATA RECEIVED FROM CLIENT DEVICES

BACKGROUND OF THE INVENTION

Users can operate a variety of different computing devices, such as smart phones, tablet devices, television (IP television) and laptops, in order to view content from websites or channels over a network. Typically, the content that a user views on the various websites can be indicative of things that the user/subscriber has an interest in and also provides the ability to analyze user's behavior trends.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Embodiments described herein provide for a system that uses data about websites visited by a user in order to predict a user's activity (or determine a user's preference) in a given time period. Based on the predicted interests of users, the system can provide personalized services or targeted advertising for individual users to provide a better user experience.

According to embodiments, the system receives usage data that corresponds to websites accessed by a user from one or more computing devices that are operated by the user. The usage data can include information identifying when and how long a user viewed (or selected to view and remained at) individual websites, as well as identifiers referencing the individual websites (e.g., a URL). The usage data can then be categorized into at least one of a plurality of categories based on the identifiers of the websites.

Still further, the system records what content items, from individual websites, the user has selected to view in order to identify one or more items of interest. The identified items of interest can provide an indication of specific people, products, or entities, a user is particularly interested in. Based on the categorizations, the identified items of interest, and when and/or how long a user viewed individual websites, the system can predict an activity of the user at a given time period. In some embodiments, the system can use a scoring algorithm that is frequency-based and/or time-based and that can use weighted scores that have been assigned or applied to one or more categories or sub-categories.

Based on the predicted activity (or activities) of the user, the system can perform one or more actions at the given time period to provide personalized services or targeting advertisements to the user. The determined user information can also be useful for understanding subscriber behavioral trends for improving services. In one embodiment, the user can provide input via the user's computing devices to either opt in to receive the personalized services or opt out from participating in the service. In other embodiments, the user can also opt in or opt out of enabling the system to track the user's usage (e.g., for privacy concerns).

As described herein, a "user" and a "subscriber" are invariably used to refer to the customers of telecommunication service provider. Also as described herein, a content item can be any content that is provided on or as a part of a website. As an example, a content item can include images, audio, music, video, other media, text (such as books, articles, blogs, posts, etc.), social media posts, advertisements, or other web content (and combinations of such) that can be viewed or selected to be viewed by a user. In addition, as described herein, a computing device can correspond to desktop computers, cellular or smart phones, personal digital assistants (PDAs), laptop computers, tablet devices, television (IP Television), etc., that can provide network connectivity and processing resources for enabling a user to access Internet content.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smart phones, personal digital assistants (e.g., PDAs), laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
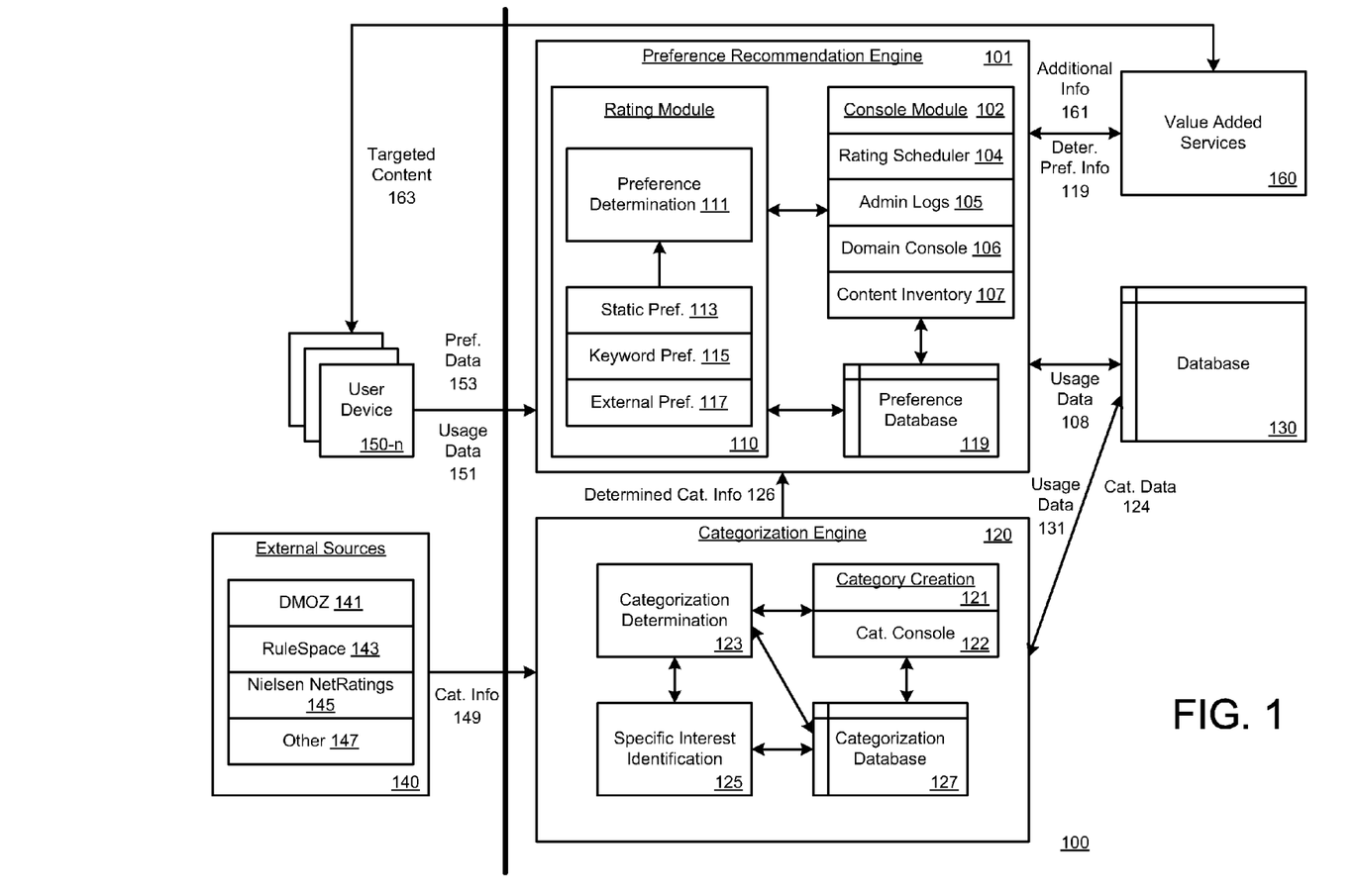
FIG. 1 illustrates an example categorization and preference recommendation system, under an embodiment.

FIG. 1 illustrates an example categorization and preference recommendation system, under an embodiment. In particular, FIG. 1 illustrates a system that can receive usage data (e.g., internet usage, phone usage, video on demand usage) from a plurality of computing devices across different platforms, process the usage data to predict an activity of a user (e.g., determine a user preference) at a given time period, and perform an action based on the predicted activity. The system can determine user preferences at different periods of time based on configured parameters or settings. A system such as described can be implemented in various contexts.

System 100 includes a preference recommendation (and scoring) engine 101, a categorization engine 120, and a main system database 130. According to embodiments, system 100 can also include value added services 160 to provide additional features for a user. According to one or more embodiments, the components of system 100 combine to use data about websites visited by a user in order to predict or determine a user's interest or preference in a given time period. For example, system 100 can use usage data for a particular user, and determine what type of website and/or content the user is likely to be interested in (and will potentially view) between 4 pm and 5 pm on a Tuesday night. In operation, the components of system 100 may be implemented on network side resources (e.g., a server or combination thereof). System 100 can communicate over a network, via a network interface (e.g., wirelessly or using a wireline), to communicate with one or more external sources 140 and one or more user devices 150.

In one implementation, system 100 can be provided as a service, that is operable to communicate with a plurality of different computing devices 150 (e.g., client terminals), such as personal computers, tablet devices, and smart phones. Accordingly, system 100 can be implemented by one or more servers, or through other computer systems in alternative architectures (e.g., peer-to-peer networks, etc.). As an alternative or addition, some or all of the components of system 100 can be implemented on client machines, such as through applications that operate on user terminals. For example, a client application may execute to perform the processes described by the various components of system 100.

According to an embodiment, system 100 can be implemented by a communications service provider, such as a wireless communication provider, a phone provider, a cable provider, and/or a satellite provider. A user that operates one or more user devices 150 can be a subscriber that subscribes to the services provided by the communications service provider. In this manner, the communications service provider can implement system 100 to use data provided by its subscribers, and in turn, to provide additional services and/or targeted advertisement to the subscribers.

In some embodiments, the preference recommendation engine 101 includes a console module 102, a rating module 110, and a preference database 119. The console module 102 can configure and control the preference recommendation engine 101. The console module 102 can be used to set up or modify one or more settings and operations of the preference recommendation engine 101. The console module 102 can be controlled by an administrator, for example, of a service provider implementing system 100 (e.g., via interaction with user interface features and providing input via input mechanisms).

The console module 102 includes a ratings scheduler 104, which can control when or how often the preference recommendation engine 101 is to perform a preference determination (e.g., predict an activity) for a particular user (or for a group of users). The ratings scheduler 104 can be configured by an administrator using parameters to set a specific date and/or time the preference recommendation engine 101 is to operate, or set periodic time periods for which to predict user activities. For example, the rating scheduler 104 can instruct the preference recommendation engine 101 to use data that is periodically or continuously received from the categorization engine 120 and perform a preference determination for a particular user or for all users/subscribers in a batch processing mode at a particular time or at periodic time periods (e.g., every fifteen minutes, or every twenty four hours, or every Saturday evening). The rating scheduler 104 can have different settings configured for individual users or for groups of users.

According to embodiments, the rating scheduler 104 can also control how much and which usage data to be used by the preference recommendation engine 101 to perform the preference determination. For example, the rating scheduler 104 can configure the preference recommendation engine 101 to predict a user activity using the last fifteen minutes of usage data received by the user device(s) 150. In this manner, the rating scheduler 104 can cause the preference recommendation engine 101 to predict a user activity for an immediate time period (e.g., in fifteen minutes, or thirty minutes), a short-term time period (e.g., in one day, or three days), or a long-term time period (e.g., in one week, one month). The administrator of system 100 can also create additional custom preferences.

The console module 102 of the preference recommendation engine 101 also includes administration logs 105, which monitors and records the processes and operations that are being performed by the preference recommendation engine 101. The administration logs 105 can keep track of the usage data received from the client devices 150, as well as categorization information 126 received from the categorization engine 120, and can record instances when the preference recommendation engine 101 predicts user activities for individual users or for a group of users or subscribers in a batch process (e.g., performs a preference determination). In some embodiments, the administration logs 105 can cause the monitored usage data, preference data, and other information to be stored in the preference database 119 and/or the main database 130 of system 100.

According to embodiments, the console module 102 can also include a domain console 106 that can be configured to enable the preference recommendation engine 101 to provide preferences or predict user activities for certain types of domains (or categories). The domain console 106 can receive category information from the categorization engine 120 so that an administrator can configure the preference recommendation engine 101 to determine preferences for a user or multiple users for a particular category or categories (e.g., movies, sports, music, etc.).

In one embodiment, the console module 102 can include content inventory 107. The content inventory 107 can maintain one or more lists that identify current products or existing items of interest for which the preference recommendation engine 101 can recommend to a user. For example, if the preference recommendation engine 101 determines that at 3 pm on Friday afternoon, the user should be recommended a particular movie to watch based on the user's usage data from the week (e.g., from movies that the user watched on video on demand, or websites corresponding to particular movies the user read reviews about), the content inventory 107 can keep records of movies that are currently out in theaters or movies that are currently available for renting or downloading (or ordering on demand). The content inventory 107 can also communicate with external sources (e.g., movie websites, advertising databases) over the network to maintain and update the lists of current products or existing items of interest. The various parameters and/or settings for the console module 102 can be stored in the preference database 119.

The preference recommendation engine 101 can also include the rating module 110 to predict a user's activity or preference at a given time period. In some embodiments, the rating module 110 can include static preferences 113, keyword preferences 115, and external preferences 117. The static preferences 113 can correspond to information that have been provided or defined by a user. For example, a user can have a profile that identifies certain preferences or interests. The user can provide items of interest (e.g., sporting teams, favorite vacation locations, restaurants, etc.) via one or more of the user's computing devices 150. Static preferences 113 can also include geographic location of the user, the user's age or gender, the user's birthday, or other personalized information that the rating module 110 can use to perform a preference determination.

Keyword preferences 115 can correspond to character strings, words, keywords, or other items that a user has entered in a search field and searched for on various websites (e.g., by searching on a shopping website or by on a search engine). External preferences 117 can correspond to information provided by external resources that the user uses using the one or more user devices 150. For example, certain websites, such as a shopping website or a video streaming website, can keep records of items that a user has purchased or videos that a user has viewed, respectively, and can provide suggestions for the user based on these items. The keyword preferences 115 and external preferences 117 can help identify particular objects or things that the user has an interest in. These various preferences can be stored in the preference database 119.

The preference determination 111 of the rating module 110 can use the different preferences 113, 115, 117 as well as the data provided by the categorization engine 120 (e.g., categorized information and usage data about websites visited by a user) in order to predict or determine a user's interest or preference in a given time period. The preferences that are determined for a subscriber or a group of subscribers can be stored in data database 119 or database 130.

In operation, system 100 can receive usage data 151 from one or more user devices 150 periodically or continuously. According to embodiments, system 100 can configure when the usage data 151 is to be received, for example, via the console module 102. The user devices 150 can include computing devices, such as smart phones, desktop computers, laptop computers, tablet devices, smart televisions, video on demand systems for televisions (e.g., set top boxes), etc., that a user can operate in order to view content on the Internet. The usage data 151 can identify individual websites the user has selected to view or has viewed using the one or more devices 150, as well as when (e.g., what date, what time) the user has selected to view the individual websites and how long (e.g., a duration) the user has remained on the website. The usage data 151 can include identifiers for identifying the individual websites, such as a uniform resource locator (URL) of the websites. In some embodiments, usage data 151 can include telephone communications, as well as content viewed over television cable or satellite (e.g., including video on demand).

Preference data 153 can also be provided from the user devices 150 to the preference recommendation engine 101 to provide additional information about particular users. For example, the static preferences 113 and the keyword preferences 115 can correspond to the user preference data 153 provided by the user devices 150. Keyword preferences 115 can be provided by, for example, the web browser operated on the user's smart phone.

In one embodiment, the preference recommendation engine 101 can receive the usage data 151 from the user devices 150 so that the administration logs 105 can record information about the usage data 151 (e.g., when the data was received, the amount of data, etc.) before the forwarded usage data 108 is provided to and stored in the main system database 130. The information corresponding to the Internet usage that is derived from the usage data 108 can be stored in the database 130 (e.g., the time, the durations, the URL, etc.). In other embodiments, the usage data 151 can be provided directly to and recorded in the database 130 and/or provided directly to the categorization engine 120 for processing.

In some embodiments, because there can be an immense amount of information and data stored in the database 130 from the usage data 108, the main database 130 can be an online analytical processing (OLAP) database for enabling efficient data analysis and processing operations. An OLAP database can be used to store data in dimensions and facts, so that information for groups of users, for example, can be quickly retrieved for processing.

The categorization engine 120 can retrieve the usage data 131 from the database 130 in order to categorize each of the individual websites (if possible) into one or more categories of a plurality of categories. In some embodiments, the categorization engine 120 can include category creation 121, categorization determination 123, specific interest identification 125, and categorization database 127. The category creation 121 can communicate with one or more external sources 140 (e.g., via plug-ins) over a network to determine a plurality of different categories that individual internet or websites can be categorized into. A website-category table can be generated and maintained by the category creation 121.

For example, the external sources 140 can include the open directory project (or DMOZ) 141, RuleSpace 143, Nielsen NetRatings 145, or other sources 147, such as Wikipedia and other Internet sources. The category creation 121 can query the external sources 140 via the plug-ins for different website domain names and the corresponding categories. The categorization information 149 can be received from the external sources 140 so that the category creation 121 can maintain lists or tables of categories for some (or all) of the different web domains available on the Internet (including websites that the user has previously visited or viewed). The category creation 121 can also perform a union process when more than one external reference categories are queried for a particular web domain (e.g., query both DMOZ 141 and RuleSpace 143). The union process can enable one record to be kept for a particular web domain, instead of two records, for example, for the same web domain. The category creation 121 can store the web domain names and their corresponding categories in the categorization database 127 or in the database 130 for future lookup by the categorization determination 123.

According to embodiments, the categories for different web domains can include broad categories as well as more specific categories from sub-categories or called as "Neurons," or specific interest identification 125. For example, categories can include broader categories like news, business, sports, television, music, technology, movies, travel, etc., and more specific categories, such as baseball, football, basketball, stocks, television dramas, game shows, piano, pop music, rap, guitar, clothing, flights, etc. In some embodiments, there can be more than a hundred categories and/or sub-categories. For example, www.espn.com can be categorized as "sports," www.amazon.com can be categorized as "shopping," and www.facebook.com can be categorized as "social media." The specific category examples can include clothing brand names such as Nike, Adidas, Prada, Armani, etc., or news brand names such as CNN, CNBC, etc.

In some embodiments, a particular website can also be categorized into more than one category. For example, for a website with the URL, money.cnn.com/news/economy/, the top domain would be cnn.com, which corresponds to a News category. The first level would be categorized as News and Money, and the second level can be categorized as News, Money, and Economy. The administrator of the categorization engine 120 can set up different settings and/or preferences for operating the categorization engine 120 using the categorization engine console 122. For example, the administrator can set to what level the categorization engine 120 should determine the categories of the web site. The category creation 121 can keep track of the websites and the corresponding category (or categories) and store them in the categorization database 127.

In one embodiment, the category creation 121 can maintain and/or update (e.g., refresh) the lists or tables of all the different web domains and corresponding categories by periodically receiving category information 149 from the external sources. The category creation 121 can perform a refresh operation at different times or periods configured or set by an administrator. In some embodiments, the refresh operation can be performed during a time where there is less bandwidth being used by system 100 (e.g., less usage data 151 being received due to low internet usage by users on devices 150), such as during the weekend or late at night.

A category console 122 can be used to configure the category creation 121 as well as the categorization engine 120. In one embodiment, the category console 122 can enable the administrator to set up various parameters and configure different settings for the categorization engine 120. For example, using the category console 122, the administrator can provide a rating or apply a score to different web domains/sub-domains and/or categories, set a start time for refreshing or updating the categorization tables (e.g., that are stored in the database 127), configure a start time for performing the categorization of usage data 131 that is retrieved and for identifying specific interests based on the usage data 131, and determine when to provide determined category information 126 to the preference recommendation engine 101. The administrator can also create custom categories for any specific domains. These custom categories can be stored in the categorization database 127 or in the database 130. In some implementations, the administrator can also screen the categories and mark few categories as "Invalid" so it can be omitted for preferences scoring. For example, a telecom subscriber can mark all the websites with mature contents as being invalid.

The category console 122 can configure the categorization engine 120 to retrieve usage data 131 periodically, for example, and perform a categorization determination 123. In some embodiments, a main or centralized console module can be included in system 100 for providing functionality for both the console module 102 of the preference recommendation engine 101 and the category console 122 of the categorization engine 120.

The categorization engine 120 also includes specific interest identification 125 that is used by the categorization engine 120 to determine individual users' interests, such as specific brand names and/or particular products and/or sports team and so on. The specific interest identification 125 can include a plurality of components, called neurons, that each represents a knowledge base for a particular topic. Each neuron can be used to track and identify brand names and/or particular products that are found in content items from websites that have been selected to be viewed by a user. In this manner, the specific interest identification 125 can identify particular items of interest for different users.

In some embodiments, there can be a shopping neuron, a movie neuron, a music neuron, a sports neuron, and a generic neuron. Each of the neurons can include a list or table (e.g., a knowledge base) of particular product names and/or brand names for a particular topic. The list or tables for each neuron can be generated and maintained using a variety of sources, such as external sources 140. For example, the shopping neuron can maintain names of stores (e.g., Macy's, Amazon.com), particular products that a user can purchase (e.g., airplane tickets, cellular phones), and/or brand names for products (e.g., Hewlett-Packard, Coca Cola), while a sports neuron can maintain names of sports, sports teams, sporting events, athletes, coaches, or other sports related items. In another example, a music neuron can maintain names of songs, albums, bands, singers, writers, record companies, or other music related items. The generic neuron can maintain data for all other names, brand names, and/or particular products that are not provided for in the other neurons (e.g., city names, geography, games, etc.).

The different neurons can maintain its knowledge base based on information received from external sources. According to an embodiment, the specific interest identification 125 can receive names and items of interest for particular neurons from external sources 140, such as Internet Movie Database (IMDB.com) or Wikipedia.com (e.g., other external sources 147). The categorization console 122 can control when information from external sources 140 can be received to update the specific interest identification 125. Based on the received information, some neurons, such as the movie neuron, for example, can be built and maintained using information from IMDB or RottenTomatoes.com (e.g., and maintain names of actors, actresses, directors, writers, films, etc.).

In operation, when the categorization engine 120 retrieves the usage data 131 from the database 130 (e.g., based on the scheduled start time configured by an administrator via the category console 122), the usage data 131 is processed by the categorization determination 123 to categorize each of the individual websites that were viewed (e.g., selected to be viewed by a user) or accessed by a user into one or more categories. The categorization determination 123 checks the URL, for example, of an individual website to categorize the web domain based on the categorizations stored in the database 127. In one embodiment, the categorization determination 123 can perform lookup operations in the categorization database 127 to identify the category (or categories) for the particular web domain.

For example, the categorization determination 123 can perform a lookup of the highest level to determine the categories, then a lookup of the next highest level, etc., and finally a lookup of the top domain level. If a category is found in any of the levels, the categorization determination 123 can record the category information with the website. The specific interest identification 125 parses the URL, for example, the website for automobile trading can be identified by categorization determination 123 as "Automobile" category, then by parsing the URL, the Neurons in specific interest identification 125 can determine which brand the subscriber was actually interested in.

When the categorization determination 123 looks up a web domain that is not found in the categorization database 127 (e.g., not previously categorized by the category creation 121), the categorization determination 123 performs a catch-up process. The catch-up process causes the category creation 121 to perform a refresh operation to update the list or table of categorized web domains that is stored in the categorization database 127. For example, the catch-up process can cause the category creation 121 to query one or more external sources 140 again to try to categorize the web domain.

In one embodiment, the catch-up process can perform a trimming process to the URL of the web domain to determine the domain name (e.g., remove the "m." from a mobile URL link (e.g., m.cnn.com) or excess numbers found in front of a domain name. If the categorization determination 123 performs the catch-up process, but the web domain is still not able to be categorized, the information corresponding to the web domain (as provided from the usage data 131, for example) can be stored in a separate database, such as a fall-out table (or dump table) for subsequent processing. In some embodiments, information and records for un-categorized web domains can be stored in the fall-out table for a predetermined period of time (which can be configured by an administrator using the category console 122), after which time, will no longer be archived (e.g., may be deleted from system 100). The administrator can also manually determine a category by accessing the console 122 for the un-categorized web domains in the fall-out table.

Based on the usage data 131, the categorization determination 123 and the specific interest identification 125 can collaborate to identify types of content a user has viewed during a time period (e.g., during the last hour, or during the last three days) as well as to identify more specific, granular details, such as particular items or brands the user has selected to view. Such information can be provided as part of determined category information 126 to the preference recommendation engine.

For example, if the usage data included information about a particular website viewed by the user, such as an article (e.g., a content item) about the San Francisco Giants from www.cnn.com, the categorization determination 123 can perform a lookup operation in the database 127 to determine that this particular website will be categorized as being a news category website. Then, by using the neurons (e.g., a sports neuron and a generic neuron), the specific interest identification 125 can parse the content item from the individual websites viewed or accessed by the user (e.g., parse the text from the article) to identify particular items of interest for a user (e.g., identify brand name or product names, such as CNN, San Francisco Giants, baseball, Major League Baseball, names of referred baseball players).

According to some embodiments, the categorization determination 123 can also include a categorization ratings component to each level of the web URL. For example, the categorization determination 123 can apply a weighting scheme to certain level of the domain of a URL. The weighting scheme enables the preference recommendation engine 101 to apply more weight-age to a particular level of the domain content to predict the user activity based on the weighted scores. For example, if the user has visited the website http://espn.go.com/mlb/team/_/name/sf/san-francisco-giants, the categorization determination 123 can apply a higher weight to the category "Major League Baseball (MLB)" or the category "San Francisco Giants," than the sport website http://espn.go.com which is a "sports" category (the category for ESPN.com). An administrator can provide weighting scores using the category console 122.

The categorization determination 123 can also maintain records of customization categories or categories indicated as being on a white-list or black-list, for example. The customized categories (e.g., created by an administrator for a particular website) or the classified categories can be configured by an administrator using the category console 122. The administrator can set a counter to count the number of times a subscriber or a group of subscribers (or all the subscribers) visit a domain or set of domain names in white-list or black-list category.

The categorization determination 123 can provide the determined categorized information 126 (after performing the categorization determination process and after determining specific interests using neurons) to the preference recommendation engine 101. The determined category information 126 can also be provided (as category data 124) to the categorization database 127 and/or the main database 130 for storage.

The rating module 110 of the preference recommendation engine 101 includes the preference determination 111, which scores the received categorized data of the usage data based on time parameters and/or frequency parameters. The preference determination 111 can predict an activity of the user at a given time period based on the determined categorizations of the usage data, the identified specific items of interest, and the number of times the user viewed the individual websites (e.g., the frequency parameters) and/or the duration of times the user viewed the individual websites (e.g., the time parameters).

For example, if a user viewed a website cnn.com/sports and also visited espn.com, first the categorization determination 123 can determine the category of the individual websites—cnn.com/sport can be categorized as News and Sports, while espn.com is categorized as Sports. The preference determination 111 can use the determined category information for this usage along with the time duration spent in each websites and the number of times the subscriber visited a particular category. From the usage data, the preference Determination 111 can identify the duration "t" that the user remained in the domain to view cnn.com/sports, and similarly identify the duration "t" for the domain espn.com. From the identified categories, the time duration will summed up to determine the total number of time the subscriber spent in each category. For example, in cnn.com/sports (News category, Sports category) the subscriber spent 20 mins, and in espn.com (Sports category) the subscriber spent 15 mins. So the total duration the user spent in the Sports category can be calculated as being 35 mins (20+15) and in the News category, 15 mins. The frequency is determined by the number of times the subscriber visited a category. For example, the frequency for Sports is 2 (1+1), while the frequency for News is 1. As a result, the time and duration for the Sports category is 35 min and 2, respectively, so this is scored higher than the News category for the particular user. The preference determination 111 then records that the first preference of the subscriber is sports.

In some cases, depending on the values set for different domain levels in the categorization console 122, weights will be applied accordingly to determine the scores for each category. For example, if the top domain is given 50% and level 1 is given 100%, then for cnn.com/sports the top domain cnn.com, which is a News category, will take only 50% of the time and duration values. In contrast, sports will take 100% of the time and duration values.

The preference determination 111 can also provide more granular or specific rankings based on the specific items of interest identified for the usage data. For example, within various websites, the user may have viewed content about the San Francisco Giants, in particular (e.g., from espn.com or sfgiants.com). This particular content can be identified to be a highly ranked item of interest, as opposed to other sports teams or other products and/or brand names.

In one embodiment, the preference determination 111 uses the information provided in the usage data 151 to determine the number of times a user has viewed (or selected to view) a particular website (and categories of websites) and the duration a user has viewed a particular website (and categories of websites). Based on the frequency parameters and/or the time parameters, and the weighted scores of the categories (if any), the preference determination 111 can rank the different categories and/or specific items of interest for a given time period. For example, the ranking can be a top ten ranking or a top twenty ranking. The preference determination 111 also determine the different categories and/or specific items of interest based on what the user viewed in the last fifteen minutes, for example, or the last hour, day, week, month, etc. (e.g., configured by rating scheduler 104).

Once the scoring and ranking is performed by the preference determination 111, the rating module 110 can predict an activity of the user based on the scoring and/or ranking (e.g., predict that the user may like to view content about flights to Hawaii after the categorization engine 120 and the rating module 110 processes usage data of the previous immediate term, fifteen minute duration).

The rating module can provide the determined preference information 119 (e.g., corresponding predicted activity) to the value added services 160. Value added service 160 includes additional services and/or features that can be provided by a communications provider that implements system 100. For example, value added service 160 can personalize services for a user and/or provide targeted advertisements or recommended content 163 to a user based on the determined preference information 119 (e.g., transmit targeted content 163 to the user devices 150 over the network). The value added services 160 can provide options to the user to opt in and/or opt out of services.

In some embodiments, the user devices 150 can provide feedback to the value added services 160 to enable the value added services 160 to modify or after the targeted content 163 in the future. For example, the user can reject the content or not select the content to view (e.g., provide negative feedback), or select the targeted content 163 to view (e.g., provide positive feedback that the targeted content 163 was liked by the user). The user devices 150 can provide such feedback information to the value added services 160 over the network. In one embodiment, the value added services 160 can also provide the feedback as additional user information 161 to the preference recommendation engine 101, so that the preference recommendation engine 101 can apply to the user preferences, e.g., the static preferences 113 and/or other preferences, for better scoring and ranking in the future. Depending on embodiments, the value added services 160 can be a part of preference recommendation engine 101 or can be provided separate from system 100 (e.g., as part of an external source, such as an advertising agency or advertising content provider).

As an alternative or addition, components or portions of components of system 100 can be performed by and on different computing devices or servers. For example, system 100 can be implemented by a collection of computing systems or servers.

Methodology

Figure 2:
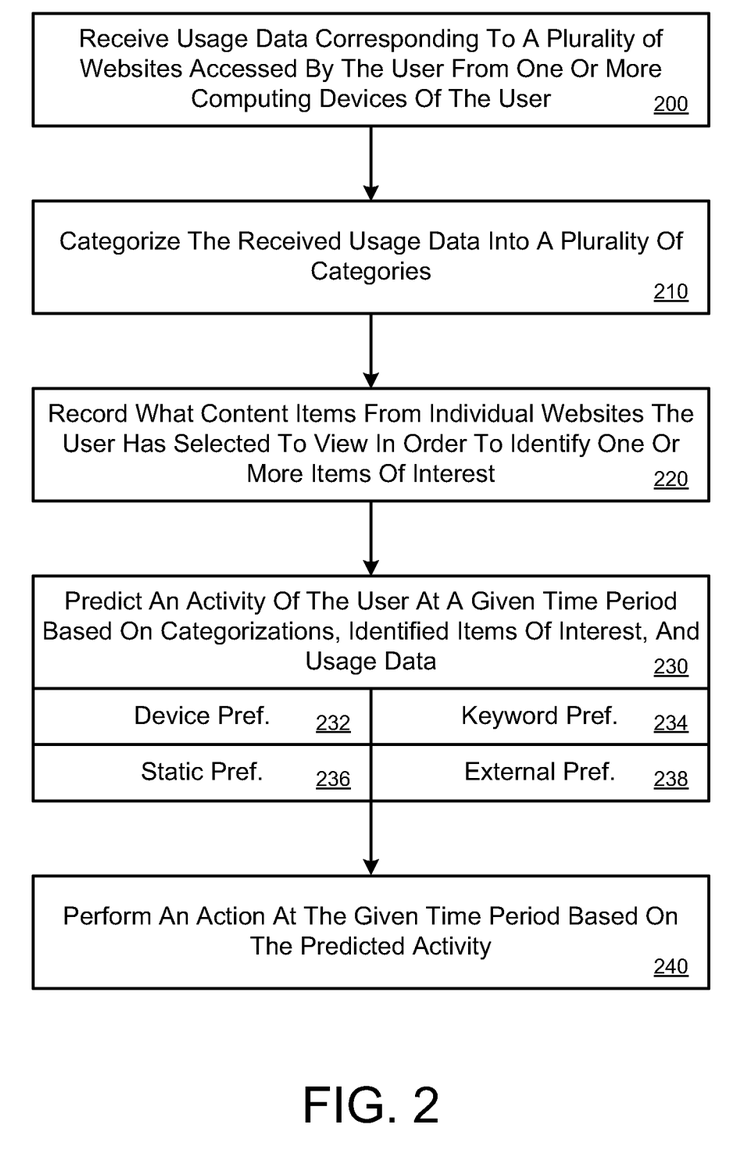
FIG. 2 illustrates an example method for predicting user activity based on usage data, according to an embodiment.

FIG. 2 illustrates an example method for predicting user activity based on usage data, according to an embodiment. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

According to an embodiment, usage data is received from one or more computing devices of the user (step 200). The usage data can correspond to information indicating content that a user has viewed, selected to view, ordered (e.g., movies ordered on video on demand), downloaded, etc., over a network(s). For example, the usage data can correspond to websites that the user has accessed using one or more computing devices (e.g., via a smart phone, or a laptop, or a tablet device). In some embodiments, a categorization and preference recommendation system can receive usage data at particular times or periodically. The timing of when usage data is to be received can be based on parameters configured via a control module. Depending on different implementations, the usage data can be first provided to different components of the categorization and preference recommendation system for real-time processing, or be provided to a database for storage and processing at a later time.

The usage data can include information about particular times (dates and/or times) a user visited or selected to view a particular website, the amount of time the user remained on the website (e.g., which can indicate that the user viewed the content items provided by the website for a period of time), and identifiers (e.g., URL) of the particular websites visited by the user. Using this information, the categorization engine can categorize the received usage data to determine what types of websites or content items the user is interested in (step 210).

The categorization engine can first generate and maintain a list or categorization table of websites (including the top domain levels and the multiple levels of a webpage) and their corresponding determined categories. For example, the categorization table of websites can identify a top level domain, such as cnn.com, to be a News category (and even more specifically, an American News category), a next level website, cnn.com/showbiz, to be a News category and an Entertainment category, and so on. The categorization table of websites can be generated and maintained using external sources, such as DMOZ, RuleSpace, Nielsen NetRatings, and other sources. The categorization table of websites can include a table having, for example, a category key for a website (e.g., a unique identifier), the URL, a category name, an identified source for the category (e.g., DMOZ or Wikipedia), and a filter, for each of the predetermined categorized websites. In one embodiment, in order to categorize each of the identified websites in the usage data, the categorization engine can perform lookup operations on the categorization table of websites for the identified websites using the URLs of the website.

For example, referring to FIG. 1, the categorization determination 123 of the categorization engine 120 can retrieve the URL of a website from the usage data (e.g., http://www.publicmobile.ca/pmconsumer/phones). The URL can be searched for extraneous text strings, such as "http://www." or "www." or "m.", which indicates a mobile website, for example, which do not assist in categorizing the websites. If such text strings are found, the categorization determination 123 can removed them from the URL (e.g., publicmobile.ca/pmconsumer/phones). In other embodiments, the top domain can also be trimmed to remove numbers from the URL, if they are present (e.g., if there is 0.0.100.facebook.com, remove "0.0.100." from the URL).

After the URL is trimmed, the categorization determination 123 can perform a lookup of the website at the highest level (e.g., the URL publicmobile.ca/pmconsumer/phones in its entirety would be the second level) in the categorization table of websites. If the URL is found in the categorization table of websites, the corresponding category name, identifier, source, filter, etc., can be retrieved and recorded in another table or list for usage data that has been categorized (e.g., determined to be in the category Technology and/or Telecommunication). The categorization determination 123 can perform a next lookup of the website at the next highest level (e.g., the URL publicmobile.ca/pmconsumer would be the first level) in the categorization table of websites. Again, if the URL is found, information about the category is retrieved and recorded. The lookup operations can continue from the highest level of a website to the top domain (e.g., publicmobile.ca) in the categorization table of websites.

In some embodiments, when a categorization cannot be determined for a website because the categorization table of websites does not include the particular URL for the website, for example, the URLs that were unable to be categorized can be stored in a catch-up table for further processing. For example, the categorization determination 123 can operate with the category creation 121 to query one or more external sources to try to determine a category for the URLs in the catch-up table.

Once the websites are categorized (and/or provided weighted scores), content items from the websites are processed and analyzed to determine one or more items of interest (step 220). According to an embodiment, after the categorization determination 123 categorizes the usage data, the specific interest identification 125 can user one or more neurons to perform keyword searches for particular products, brand names, geographic locations, etc. within the different lists/tables of the different neurons (e.g., sports neuron, shopping neuron). Referring back to the example above, content items from publicmobile.ca can be searched, publicmobile.ca/pmconsumer can be searched next, and publicmobile.ca/pmconsumer/phones can be searched next, and so forth, to determine particular items of interest that a user is interested in (e.g., the brand names, Samsung or iPhone, for example, can be identified from the content). If certain keywords are found, information about the corresponding items of interest (e.g., name, identifier, source, filter, etc., similar to the categorization table of websites), can be retrieved and recorded in a specific interest table or list.

The information determined and recorded by the categorization engine can be provided to the preference recommendation engine so that the preference recommendation engine can perform a scoring and preference ranking based on the categorized usage data and identified items of interest. Based on the scoring and rankings (using time parameters and/or frequency parameters), an activity of a user (and/or particular user preferences corresponding to specific identified items of interest) can be predicted at a given time period (step 230). The predicted activity can be based on the categorized usage data, the identified items of interest, and the timing information provided by the usage data.

According to embodiments, there can be three (or more) types of scoring—immediate scoring, short-term scoring and long-term scoring. For example, immediate scoring can be derived from fifteen minutes of usage data, while short-term scoring can be derived from one day or multiple days of usage data. Long-term scoring can be derived from weeks or months of usage data. The different types of scoring that is to be performed by the categorization and preference recommendation system can be configured by an administrator user via the control modules of the system.

The scoring can also be based on time parameters and/or frequency parameters. For example, usage data can include timing information for the websites visited by a user. For a time based preference score, categories can be scored and ranked based on how much time (e.g., duration of time) a user has spent at websites corresponding to the particular category during a given period of time. Time spent by a user at various websites that fall under one category can be summed together to get a cumulative score. The cumulative score can also be averaged to determine the average amount of time spent in one category relative to other categories. For a frequency based preference score, categories can be scored and ranked based on how many times (e.g., a number of times) a user has selected to view or viewed websites corresponding to a particular category during a given period of time. Similarly, the number of times a user visited various websites that fall under one category can be summed together to get a cumulative score (and/or average). The categories can then be scored and ranked in a descending order.

Based on the scoring and ranking, an activity of a user can be predicted for a given time period. For example, the predicted activity can be determined for a particular day and/or time, and can be that the user may want to view an action flick, or listen to a particular genre of music, or view offers on a website for a clothing store. The predicted activity (or activities) can also be based on device preferences (sub-step 232) corresponding to the type of device the usage data was retrieved from (e.g., usage data from video on demand over a set top box, compared to usage data from a smart phone). In other embodiments, the predicted activity can also be based on keyword preferences (sub-step 234) corresponding to keywords from searches made by the user on a browser or websites, static preferences (sub-step 236) corresponding to preferences that have been provided by a user and/or provided in a user profile, and/or external preferences (sub-step 238) corresponding to preferences determined by external sources (e.g., preferred clothing purchased by a user on an online shopping website, or movies streamed by a user on a video service website or application).

According to embodiments, the categorization and preference recommendation system can also provide weighted scores to certain categories based on previously analyzed usage data of a user. For example, the categorization engine can apply a weighting scheme/scores to one or more categories that are deemed to be of more interest to a particular user. By providing different weights to different categories, the preference recommendation engine can then score and rank the categories by taking into account categories that are deemed to be of more interest to the user.

By predicting an activity of the user, an action can be performed at the given time period based on the activity of the user (step 240). In some embodiments, the categorization and preference recommendation system can provide personalized services or targeting advertisements to the user based on the predicted activity.

Figure 3:
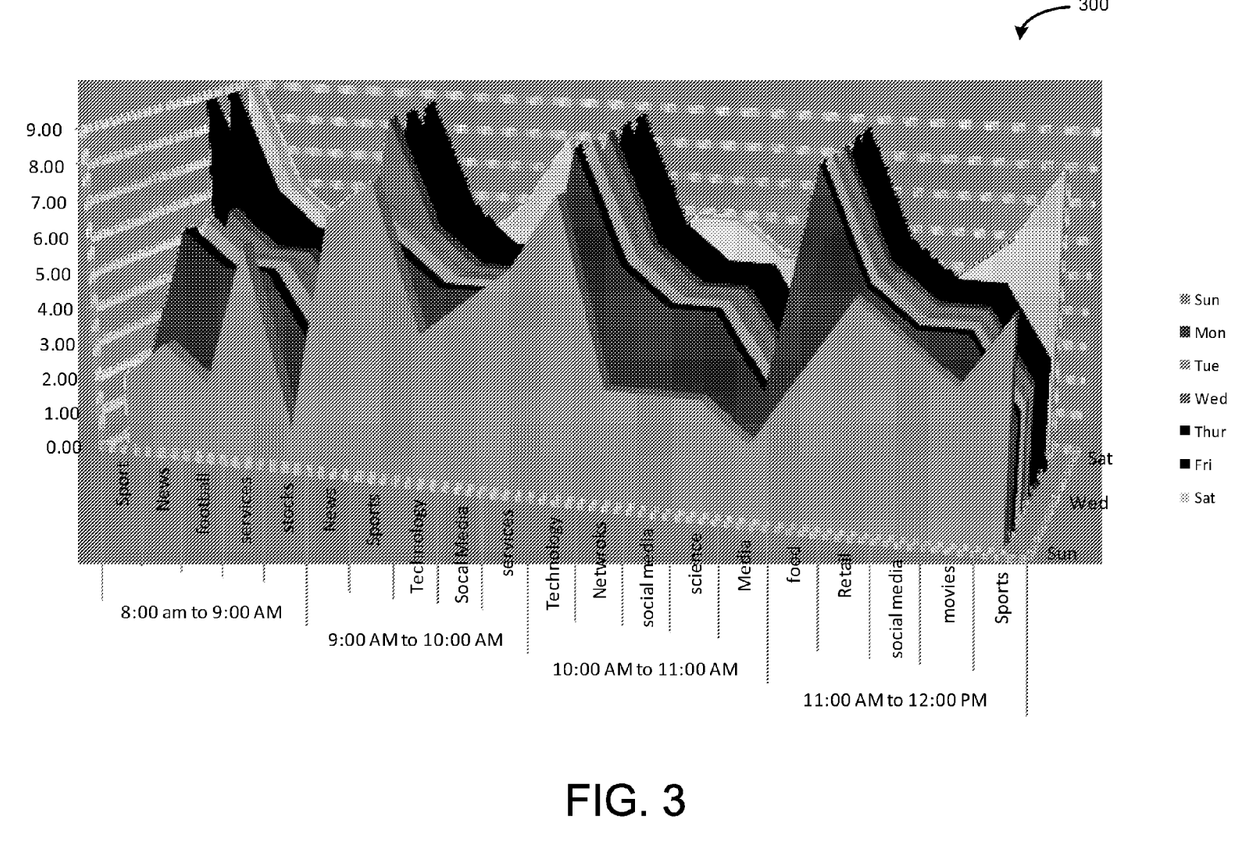
FIG. 3 illustrates an example graphical representation of recorded data for a user, under an embodiment.

FIG. 3 illustrates an example graphical representation of recorded data for a user, under an embodiment. The graphical representation 300 illustrates a time based categorization of usage data for a user over the course of one week from 8:00 am to 12:00 pm. In some embodiments, the graphical representation 300 can illustrate categorized usage data that is averaged for a number of different weeks from 8:00am to 12:00 pm.

The graphical representation 300 illustrates that from 8:00 am to 9:00 am, the user has viewed websites that correspond to a sports category for a duration of a little less than 2 minutes, while the user has viewed websites that correspond to a services category for more than 5 minutes on Sunday of the week. In addition, the graphical representation 300 illustrates that on Monday through Friday, the user engaged in activities that correspond to a food category for approximately 8 and a half minutes during the time period of 11:00 am to noon.

The categorization and preference recommendation system can use the categorized usage data, such as illustrated in the graphical representation 300, to score and rank the usage data (based on frequency parameters and/or time parameters) to predict an activity of a user at a given time period.

Figure 4:
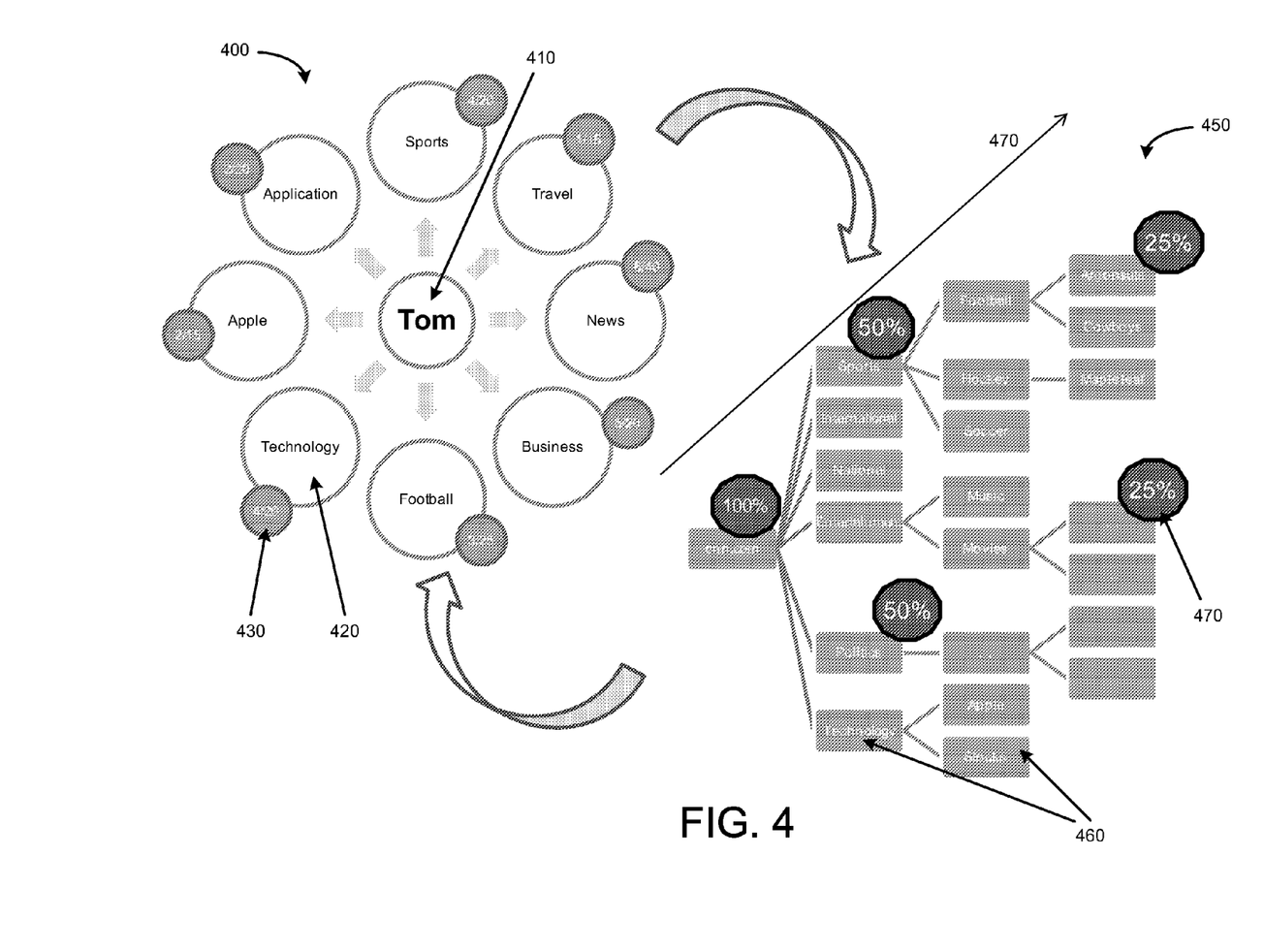
FIG. 4 illustrates an example illustration of categories of websites viewed by a user and a scoring scheme for the categories and sub-categories, according to an embodiment.

FIG. 4 illustrates an example illustration of categories of websites viewed by a user and a scoring scheme for the categories and sub-categories, according to an embodiment. FIG. 4 illustrates a diagram 400 that describes different usage data categories 420 that have been identified from the usage data for a particular user 410 (e.g., Tom). For each identified category 420 corresponding to content and/or websites viewed or selected to be viewed by the user 410, timing information 430 can be recorded by the categorization and preference recommendation engine. For example, the timing information 430 can include a frequency of times a user visited websites that correspond to a category and the duration of time (e.g., total cumulative time) that the user remained on or viewed websites that correspond to a category (e.g., for the Business category, the user 410, Tom, visited websites that were categorized as Business 5 times, for a total of 20 minutes).

FIG. 4 also illustrates a scoring scheme 450 for the particular user 410, Tom, based on previously analyzed and/or processed usage data information for the user. The scoring scheme 450 can be applied to the determined category information and timing information, as illustrated in the diagram 400. For example, weighted scores for the scoring scheme 450 can be applied as part of a hierarchical configuration (direction of 470) of categories and sub-categories. A specific item of interest (cnn.com) can be given a 100% weighted score if it has been determined that the user, Tom, prefers to frequently visit news category websites (and in particular, cnn.com). In addition, if it has been determined that the user does not frequently visit websites about sports, the category sports can be given a 50% weighted score.

When the preference recommendation engine scores and ranks the categories and/or specific items of interest, it can take into consideration the weighted scores. In this manner, the preference recommendation engine can apply the weighted scores to the categorized usage data. For example, although the user visited various sports websites 4 different times and viewed sports websites for 20 minutes during a period of time, because of the weighted score of 50%, the usage data can be altered as if the user visited sports websites only twice, and for only 10 minutes. The preference recommendation engine can then rank the categorized usage data based on the weighted scoring.

Hardware Diagram

Figure 5:
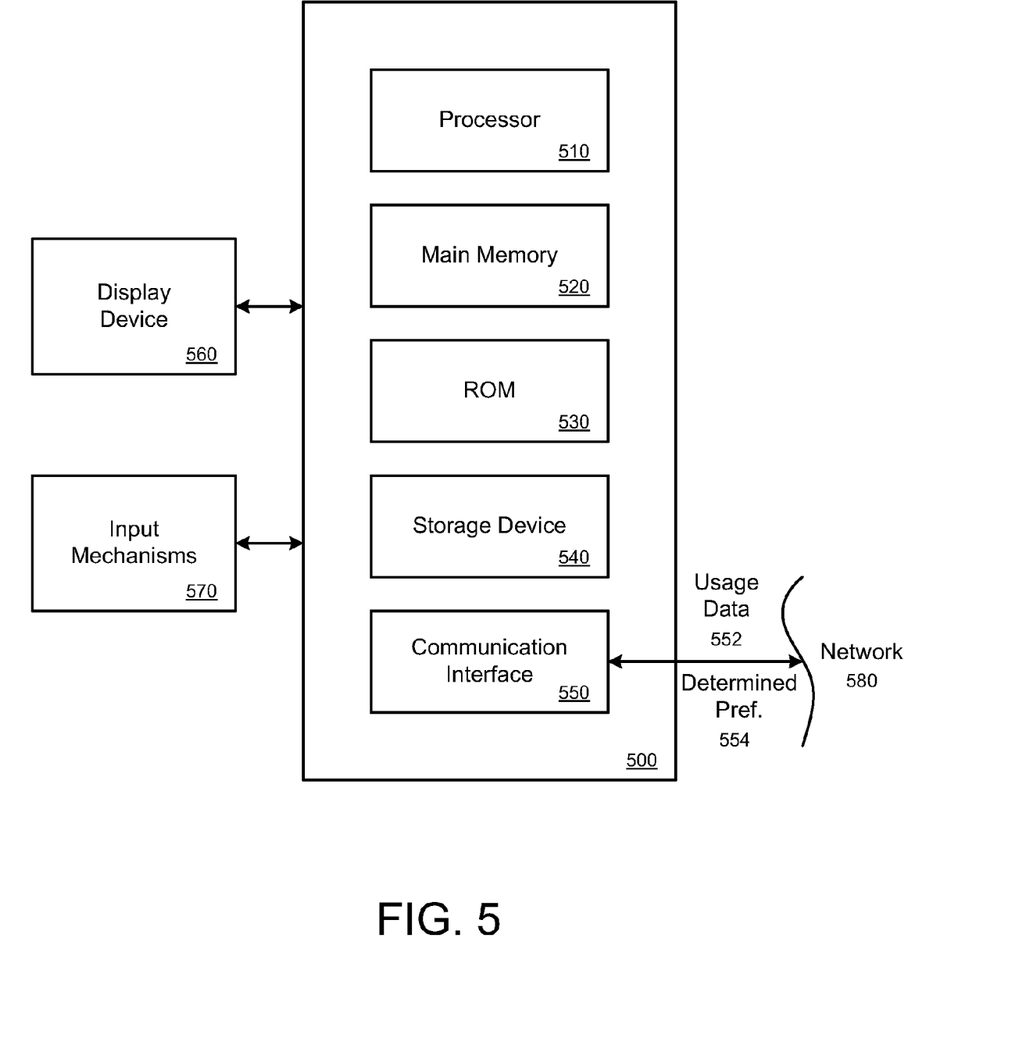
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using a computer system such as described by FIG. 5.

In an embodiment, computer system 500 includes processing resources 510, main memory 520, ROM 530, storage device 540, and communication interface 550. Computer system 560 includes at least one processor 510 for processing information. Computer system 500 also includes a main memory 520, such as a random access memory (RAM) or other dynamic storage device, for storing information and instructions to be executed by the processor 510. Main memory 520 also may be used for storing temporary variables or other intermediate information during execution of instructions to be executed by processor 510. Computer system 500 may also include a read only memory (ROM) 530 or other static storage device for storing static information and instructions for processor 510. A storage device 540, such as a magnetic disk or optical disk, is provided for storing information and instructions.

The communication interface 550 may enable the computer system 500 to communicate with one or more networks 580 through use of the network link (wireless or wireline). Using the network link, the computer system 500 can communicate with one or more computing devices, and one or more servers. In some embodiments, the computer system 500 can be configured to receive usage data 552 from one or more computing device (e.g., belonging to a user) via the network link. The usage data 552 can be processed by the processor 510, and the usage data 552 (as well as the processed data) can be stored in, for example, the storage device 540. Once the computer system 500 predicts an activity of a user based on the received usage data 552, the determined predictions or preferences 554 can be communicated to one or more other servers for additional processing (e.g., a system for providing value added services). In one embodiment, the computer system 500 can provide personalized services and/or targeted advertising to the one or more computing devices based on the determined predictions or preferences 554.

Computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to computer system 500 for communicating information and command selections to processor 510. Other non-limiting, illustrative examples of input mechanisms 570 include a mouse, a trackball, touch-sensitive screen, or cursor direction keys for communicating direction information and command selections to processor 510 and for controlling cursor movement on display 560.

Embodiments described herein are related to the use of computer system 500 for implementing the techniques described herein. According to one embodiment, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in main memory 520 causes processor 510 to perform the process steps described herein. In alternative embodiments, hard-wired circuitry may be used in place of or in combination with software instructions to implement embodiments described herein. Thus, embodiments described are not limited to any specific combination of hardware circuitry and software.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A non-transitory computer readable medium storing instructions that, when executed by one or more processors, cause the one or more processors to perform steps comprising:
    receiving usage data corresponding to a plurality of websites accessed by a user from one or more computing devices of the user, the usage data including character strings that reference the individual websites viewed by the user;
    categorizing the received usage data into a plurality of categories based on the character strings that reference the individual websites;
    recording what content items from individual websites the user has selected to view in order to identify one or more items of interest;
    predicting an activity of the user at a given time period based on (i) the categorizations, (ii) the identified one or more items of interest, and (iii) times or durations of time the user viewed the individual websites; and
    performing an action at the given time period based on the predicted activity;
    wherein the plurality of categories are predetermined using one or more external sources.

2. The non-transitory computer readable medium of claim 1, wherein the instructions further cause the one or more processors to categorize the received usage data into the plurality of categories by retrieving a uniform resource locator (URL) of individual websites of the plurality of websites from the usage data, and parsing the URL of individual websites.

3. The non-transitory computer readable medium of claim 1, wherein the instructions further cause the one or more processors to record what content items from individual websites the user has selected to view by performing string matching operations on the content items to identify one or more names, words, or phrases that have been predetermined to be items of interest.

4. The non-transitory computer readable medium of claim 1, wherein the instructions further cause the one or more processors to predict an activity of the user at a given time period by determining the one or more preferences of the user based further on at least one of (i) information corresponding to the one or more computing devices of the user, (ii) information provided by one or more services used by the user, or (iii) information provided by the user.

5. The non-transitory computer readable medium of claim 1, wherein the instructions further cause the one or more processors to categorize the received usage data into the plurality of categories by assigning a weighting score to one or more of the plurality of categories.

6. The non-transitory computer readable medium of claim 5, wherein the instructions further cause the one or more processors to predict the activity of the user at the given time period based on the one or more weighting scores assigned to the one or more of the plurality of categories.

7. A system comprising:
    one or more memory resources;
    a communication interface; and
    one or more processors coupled to the one or more memory resources and the communication interface the one or more processors to:
    receive usage data corresponding to a plurality of websites accessed by a user from one or more computing devices of the user via the communication interface, the usage data including character strings that reference the individual websites viewed by the user;
    categorize the received usage data into a plurality of categories based on the character strings that reference the individual websites, the plurality of categories being predetermined using one or more external sources;
    record what content items from individual websites the user has selected to view in order to identify one of more items of interest;
    predict an activity of the user at a given time period based on (i) the categorizations, (ii) the identified one or more items of interest, and (iii) the times or the duration of times the user viewed the individual websites;
    perform an action at the given time period based on the predicted activity; and
    categorize the received usage data into the plurality of categories by retrieving a uniform resource locator (URL) of individual websites of the plurality of websites from the usage data and parsing the URL of individual website.

8. The system of claim 7, wherein the one or more processors record what content items from individual websites the user has selected to view by performing string matching operations on the content items to identify one or more names, words, or phrases that have been predetermined to be items of interest.

9. The system of claim 7, wherein the one or more processors predict an activity of the user at a given time period by determining the one or more preferences of the user based further on at least one of (i) information corresponding to the one or more computing devices of the user, information provided by one or more services used by the user, or (iii) information provided by the user.

10. The system of claim 7, wherein the one or more processors categorize the received usage data into the plurality of categories by assigning a weighting score to one or more of the plurality of categories.

11. The system of claim 10, wherein the one or more processors predict the activity of the user at the given time period based on the one or more weighting scores assigned to the one or more of the plurality of categories.

12. A method for determining an interest of a user based on content accessed by the user, the method being performed by one or more processors and comprising:
    receiving usage data corresponding to a plurality of websites accessed by the user from one or more computing devices of the user, the usage data including character strings that reference the individual websites viewed by the user;
    categorizing the received usage data into a plurality of categories based on the character strings that reference the individual websites, wherein categorizing the received usage data includes assigning a weighting score to one or more of the plurality of categories;

recording what content items from individual websites the user has selected to view in order to identify one or more items of interest;

predicting an activity of the user at a given time period used on (i) the categorizations, (ii) the identified one or more items of interest, and (iii) the times or the duration of times the user viewed the individual websites;

performing an action at the given time period based on the predicted activity; and categorizing the received usage data into the plurality of categories by retrieving a uniform resource locator (URL) of individual websites of the plurality of websites from the usage data, and parsing the URL of individual websites.

\* \* \* \* \*

UNITED STATES PATENT AND TRADEMARK OFFICE
CERTIFICATE OF CORRECTION

PATENT NO. : 8,930,294 B2  
APPLICATION NO. : 13/562256  
DATED : January 6, 2015  
INVENTOR(S) : Krishna Kumar Anandaraj Page 1 of 1

It is certified that error appears in the above-identified patent and that said Letters Patent is hereby corrected as shown below:

In the Claims

In column 18, line 7, in Claim 7, delete "interface" and insert -- interface, --, therefor.

In column 18, line 20, in Claim 7, delete "of" and insert -- or --, therefor.

In column 18, line 32, in Claim 7, delete "data" and insert -- data, --, therefor.

In column 18, line 44, in Claim 9, delete "information" and insert -- (ii) information --, therefor.

In column 19, line 4, in Claim 12, delete "used" and insert -- based --, therefor.

Signed and Sealed this  
Fifteenth Day of September, 2015

Michelle K. Lee  
*Director of the United States Patent and Trademark Office*